United States Patent
Sherry et al.

(10) Patent No.: US 8,149,269 B2
(45) Date of Patent: Apr. 3, 2012

(54) EMERGENCY SERVICES CALL DELIVERY FROM A LEGACY COMMUNICATIONS DEVICE TO A VOIP PSAP

(75) Inventors: Robert Allen Sherry, Aurora, IL (US); Lawrence W. Ciesla, Yorkville, IL (US); Patti L. McCalmont, Danville, IA (US)

(73) Assignee: West Corporation, Omaha, NE (US)

( * ) Notice: Subject to any disclaimer, the term of this patent is extended or adjusted under 35 U.S.C. 154(b) by 1393 days.

(21) Appl. No.: 11/733,257

(22) Filed: Apr. 10, 2007

(65) Prior Publication Data

US 2008/0253535 A1    Oct. 16, 2008

(51) Int. Cl.
*H04M 11/00* (2006.01)

(52) U.S. Cl. .......................................... 348/45

(58) Field of Classification Search ............... 379/45, 379/37, 90.01; 370/352

See application file for complete search history.

(56) References Cited

U.S. PATENT DOCUMENTS

| | | | |
|---|---|---|---|
| 5,379,337 A * | 1/1995 | Castillo et al. ................. | 379/45 |
| 6,914,896 B1 | 7/2005 | Tomalewicz | |
| 7,012,888 B2 | 3/2006 | Schoeneberger et al. | |
| 7,027,564 B2 | 4/2006 | James | |
| 7,079,627 B2 | 7/2006 | Crago et al. | |
| 7,120,139 B1 | 10/2006 | Kung et al. | |
| 2004/0190497 A1 * | 9/2004 | Knox ............................ | 370/352 |
| 2005/0201529 A1 | 9/2005 | Nelson et al. | |
| 2005/0213716 A1 | 9/2005 | Zhu et al. | |
| 2005/0232164 A1 | 10/2005 | Anzarouth et al. | |
| 2005/0282518 A1 | 12/2005 | D'Evelyn et al. | |
| 2006/0077961 A1 | 4/2006 | Crago et al. | |
| 2006/0078094 A1 | 4/2006 | Breen et al. | |
| 2006/0221937 A1 | 10/2006 | Olivier et al. | |
| 2006/0293024 A1 | 12/2006 | Benco et al. | |
| 2007/0003024 A1 * | 1/2007 | Olivier et al. .................... | 379/45 |
| 2008/0037715 A1 * | 2/2008 | Prozeniuk et al. ............. | 379/45 |

* cited by examiner

Primary Examiner — Stella Woo

(57) ABSTRACT

An Emergency Services Application Server (ES-AS) that obtains routing instructions for both VoIP-originated and non-VoIP-originated calls to emergency services numbers (e.g., 9-1-1). If the emergency request is a VoIP-originated call and includes a location object, the ES-AS queries its database using the location object to obtain routing information. If a location object is not provided, the ES-AS queries a location information server to obtain a location object. The ES-AS then uses the location object to query its database. If the call is originated by legacy user equipment, the ES-AS accesses a legacy automatic location information system to obtain location information and the associated PSAP. The ES-AS then queries its database with the returned information to refine routing information needed to route the call to the identified PSAP. The ES-AS includes a web services interface that allows a PSAP or authorized agency to change routing instructions dynamically, which overrides any static data in the ES-AS's routing database.

33 Claims, 10 Drawing Sheets

EMERGENCY SERVICES CALL DELIVERY FROM A LEGACY COMMUNICATIONS DEVICE TO A VOIP PSAP

BACKGROUND OF THE INVENTION

This invention relates to the field of enhanced 9-1-1 (E9-1-1) emergency services networks, and, more specifically, to an E9-1-1 system that facilitates the transition from the current circuit-switched emergency services networks to a full-featured voice over Internet protocol (VoIP) emergency services networks.

The National Emergency Number Association (NENA) has developed a specification for delivering emergency services calls from VoIP networks into the current circuit-switched emergency services networks (called "i2"). In accordance with this specification, a VoIP communications device originates an emergency services call by sending a call initiation request to a call server. The call initiation request includes the telephone number (TN) of the calling VoIP communications device and either a predefined location object that designates the location of the VoIP communications device or a reference to the location of the VoIP communications device. The call server receives the call initiation request and queries a VoIP Positioning Center (VPC). The VPC, in conjunction with a location information server (LIS) and an emergency routing database (ERDB), uses the location object or location reference to identify a public safety answering point (PSAP) that serves the location of the calling VoIP communications device.

The VPC returns an Emergency Services Routing Number (ESRN) and Emergency Services Query Key (ESQK) to the call server. Additionally, the VPC stores the TN of the calling VoIP communications device and its location in conjunction with the ESQK. The call server uses the ESRN to route to call to a gateway connected to a selective router that serves the selected PSAP. The selective router uses the ESQK to route the call to the selected PSAP and forwards the ESQK. The PSAP uses the ESQK to query the VPC via the incumbent emergency service provider's local automatic location information (ALI) database for the location of the calling communications device.

NENA (and others) are also developing specifications for emergency requests from VoIP networks that are delivered to a VoIP-enabled PSAP. At this point, NENA has developed requirement specifications, but has just begun defining call delivery methodology. In the current art, routing of an emergency services call from a VoIP communications device to an IP PSAP is based on the location object from the VoIP-enabled communications device or from a LIS in the VoIP service provider's network. The call is routed into an appropriate VoIP emergency services network based on the location object. The VoIP emergency services network uses the location object to route the call through the network to the appropriate IP PSAP.

A problem in the art is that neither the extant or proposed standards nor the current art provides a method for routing legacy business and residential subscribers of an incumbent local exchange carrier (ILEC) to an IP PSAP.

SUMMARY OF THE INVENTION

This problem is solved and a technical advance is achieved in the art by an Emergency Services Application Server (ES-AS) that resides in a VoIP-based emergency services network. The ES-AS provides routing instructions so that an emergency services call may be routed to the appropriate IP PSAP regardless of the technology of the calling communications device. A routing proxy in the VoIP-based emergency services network wherein the emergency services call originated interrogates the ES-AS in order to obtain such routing instructions. A routing proxy in the context of a VoIP service provider network is generally known in the art as a Control/Signaling Control Function (CSCF). For purposes of describing this invention, the term "Emergency Services CSCF" (abbreviated as "E-CSCF") is used to denote a routing proxy in a VoIP-based emergency services network.

In accordance with this invention, when an emergency services call provides a location object to the E-CSCF, the E-CSCF queries the ES-AS, using the location object as a query key. The ES-AS uses its normal or usual procedures (e.g., an internal or external database) to determine routing instructions. The ES-AS returns the routing instructions to the E-CSCF, which the E-CSCF then uses to route the call to an IP PSAP. Importantly, if the emergency services call originates without a location object, the ES-AS queries another network element to obtain a location object. In one exemplary embodiment, the ES-AS queries a location information server (LIS) for a location object. In another exemplary embodiment, the ES-AS queries a legacy ALI of the incumbent emergency services network for a location object. Once the ES-AS receives the location object, it uses its normal or usual procedures to obtain routing instructions.

When the ES-AS obtains routing instructions, it may determine that the destination IP PSAP is not in service. In that case, the ES-AS provides alternate routing instructions to the E-CSCF. Advantageously, the ES-AS provides the capability of dynamically changing routing instructions. In accordance with this aspect of this invention, the IP PSAP or another authorized agency may use a web services interface to add, modify or delete routing instructions. For example, a PSAP may not operate at certain times or on certain days. Such parameters are entered into the ES-AS and take precedence over the usual or static routing information.

BRIEF DESCRIPTION OF THE DRAWINGS

A more complete understanding of this invention may be obtained from a consideration of this specification taken in conjunction with the drawings, in which.

DETAILED DESCRIPTION

Figure 1:
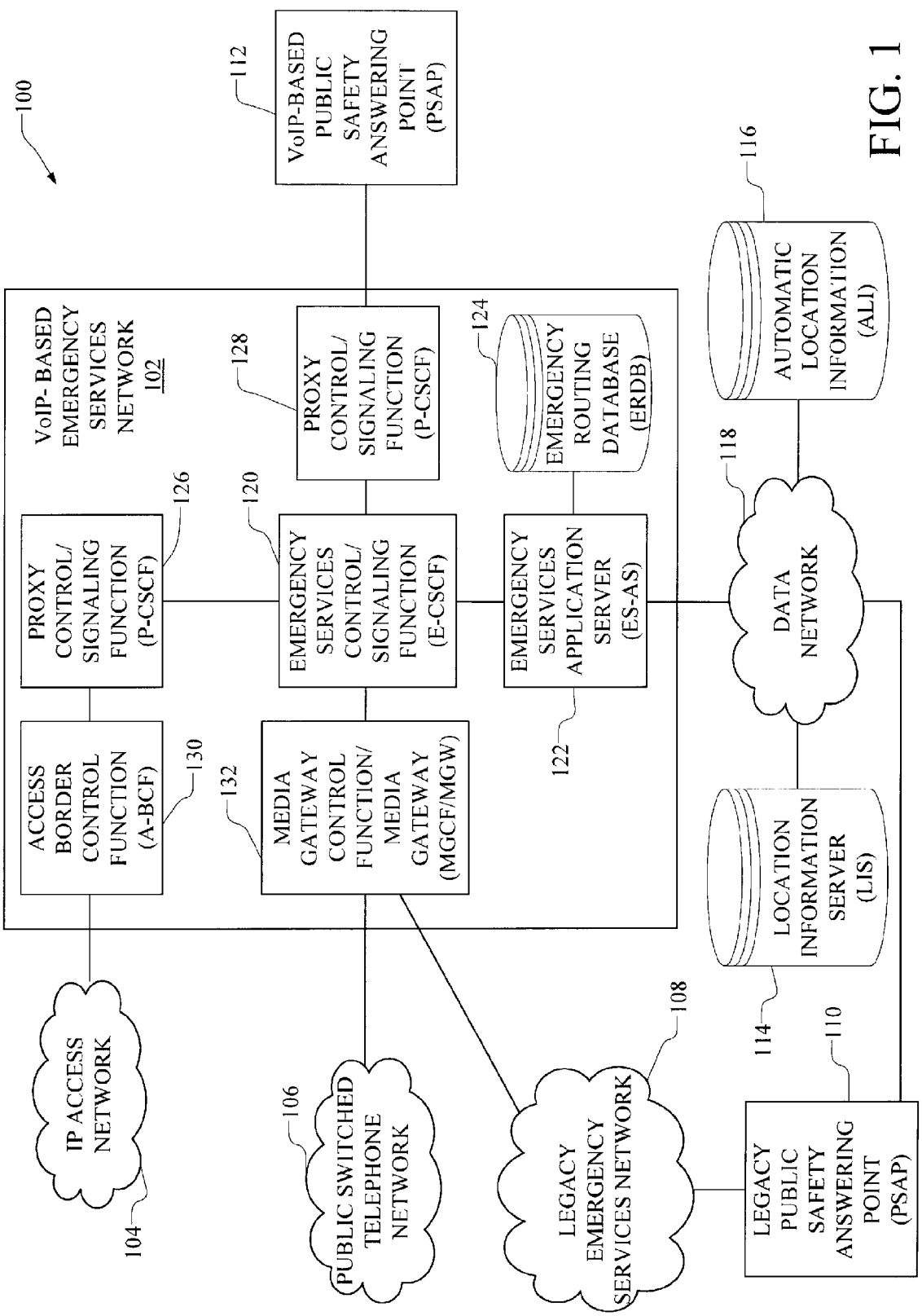
FIG. 1 illustrates a block diagram of an exemplary architecture of an emergency services network in accordance with this invention.

FIG. 1 illustrates a communications network 100 wherein a VoIP-based emergency services network 102 in accordance with this invention operates. For purposes of describing the exemplary embodiment of this invention, emergency service processing in accordance with United States practice is described. One skilled in the art will understand how to adapt this invention to operate in the context of other countries after reviewing this specification.

In the United States (and Canada), the emergency services number is "9-1-1." As is known in the art, 9-1-1 is not destination specific; that is, a call placed to 9-1-1 cannot be routed to a destination without knowing at least an approximation of the location of the calling party. The goal of an emergency services network, therefore, is to route an emergency services call to a public safety answering point (PSAP) local to the caller. A call taker at the local PSAP can then dispatch appropriate aid in a timely manner.

To this end, the geographical area of the United States is divided into a plurality of emergency services zones (ESZ's). Each of the PSAP's serves one (or more) of the ESZ's near its location. In case a PSAP is busy or has been abandoned due to an emergency, one or more PSAP's may be designated as alternate or overflow PSAP's. When the communications network cannot determine the origin of the emergency services call, the call is routed to a default PSAP to handle the call and then rerouted to an appropriate PSAP, if possible.

In accordance with this invention, emergency services network 102 routes emergency services calls from a plurality of public and private service provider networks to a public safety answering point (PSAP) that serves an emergency services zone (ESZ) from which the call originated. In this exemplary embodiment of this invention, emergency services network 102 provides emergency services call routing for IP access network 104 and a portion of the publicly switched telephone network (PSTN) 106. IP access network 104 and PSTN 106 are representative; one skilled in the art will understand that emergency services network 102 can be connected to a plurality of VoIP service provider networks and connect to the networks at a plurality of points. Additionally, one skilled in the art will understand that emergency services network 102 may be connected to PSTN 106 at a plurality of points. For example, emergency services network 102 may be connected to a mobile switching center of a wireless network, to a selective router, to a class 5 switch, to a private PBX, or any combination thereof.

VoIP-based emergency services network 102 may also be connected to one or more legacy emergency services networks, represented by legacy emergency services network 108. Legacy emergency services network 108 comprises a circuit switched network, which may be part of PSTN 106. Legacy emergency services network 108 supports routing to a plurality of legacy PSAP's, represented by legacy PSAP 110. Legacy emergency services network 108 and legacy PSAP 110 are well known in the art and are therefore not further described.

VoIP-based emergency services network 102 supports one or more VoIP-based PSAP's, represented by VoIP-based PSAP 112. VoIP-based PSAP 112 supports a plurality of VoIP-based call taker terminals. Such VoIP-based PSAP's and VoIP-based call taker terminals are specified in the above referenced NENA i2 specification, which is incorporated herein by reference in its entirety.

In accordance with one aspect of this invention, VoIP-based emergency services network 102 is connected to one or more location information server (LIS), represented by LIS 114, one or more automatic location information (ALI) databases, represented by ALI 116, or both. In this exemplary embodiment, VoIP-based emergency services network 102 is connected to LIS 114 and ALI 116 via data network 118. Data network 118 is a representative element and not intended to be limiting; data network 118 may comprise dedicated data links, a secured or private data communications network, an SS7 network or may be a part of an IP access network, such as, but not limited to, IP access network 104. LIS 114 and ALI 116 are illustrated herein as being separate elements for clarity and convenience. One skilled in the art understands that these elements may be stand-alone elements or components of other networks. For example, LIS 114 may comprise part of IP access network 104 and ALI 116 may comprise part of legacy emergency services network 108.

VoIP-based emergency services network 102 includes emergency services control/signaling function (E-CSCF) 120. E-CSCF 120 provides signaling and routing functions within and for VoIP-based emergency services network 102 in the same manner as is known in the art for proxy control/signaling function in VoIP service provider networks. In accordance with this invention, however, E-CSCF 120 performs its routing and signaling function in conjunction with emergency services application server (ES-AS) 122. ES-AS 122 provides routing instructions to E-CSCF 120 for emergency calls. In general, ES-AS 122 receives the telephone number (TN) of the caller and, potentially, a location object from E-CSCF 120. ES-AS 122 uses emergency routing database (ERDB) 124, LIS 114, ALI 116, or any combination thereof, to determine an identification of a PSAP (herein "PSAP ID") that serves the ESZ wherein an emergency call originated and delivers the PSAP ID and additional routing instructions, such as alternate PSAP's, if needed, back to E-CSCF 120. This processing will be described in more detail below in connection with FIGS. 7 and 8. FIG. 1 shows ES-AS 122 as part of emergency services network 102. However, ES-AS 122 may be in any VoIP-based network or provided by a third party that interfaces to emergency services network 102.

In the context of FIG. 1, emergency services calls may originate from IP access network 104, which connects via VoIP to emergency services network 102. An emergency services call from IP access network 104 is first routed through access border control function (ABCF) 130. ABCF 130 provides security and access control function as are known in the art. The emergency services call is then routed to proxy control/signaling function (P-CSCF) 126. P-CSCF 126 recognizes that the call is to a special, indeterminate number and routes the call to E-CSCF 120 to determine the destination identification. E-CSCF 120 delivers the TN of the calling telephone and a location object, if it is available to ES-AS 122. ES-AS 122 returns a destination PSAP ID and additional routing instruction, if needed.

If ES-AS 122 delivers a PSAP ID (e.g., a Universal Resource Indicator [URI]) of a VoIP-based PSAP, such as VoIP-based PSAP 112, E-CSCF 120 routes the call through P-CSCF 128 to VoIP-based PSAP 112. As stated above, VoIP-based emergency services network 102 may support a plurality of IP access networks. Therefore, A-BCF 130 is representative; there may be a plurality of A-BCF's in VoIP-based emergency services network 102. Further, there may be as many P-CSCF's in VoIP-based emergency services network 102 as needed to support the A-BCF's. Likewise, P-CSCF 128 is representative; there may be a plurality of P-CSCF's, each of which may support a plurality of VoIP-based PSAP's. One skilled in the art will understand that, if VoIP-based PSAP is not in a secure network or on direct communications link, then there is another A-BCF to prevent unauthorized access to VoIP-based emergency services network 102.

Emergency services calls may also originate from PSTN 106, from, for example, a Class 5 central office. These emergency services calls enter emergency services network 102 through a Media Gateway Control Function/Media Gateway (MGCF/MGW) 132 and are delivered to the E-CSCF 120. Furthermore, emergency services calls may be transferred from and/or delivered to a legacy emergency services network 108 from the E-CSCF 120 via MGCF/MGW 132. MGCF/MGW 132 performs conversions from, for example, SS7 trunks to VoIP-based communications, as is known in the art. MGCF/MGW 132 then originates a VoIP call to E-CSCF 120.

Additionally, an emergency services call can be routed to a legacy PSAP, such as legacy PSAP 110. In this situation, the call is routed through MGCF/MGW 132 to legacy emergency services network 108. In accordance with this exemplary example, MGCF/MGW 132 terminates the VoIP-based call and converts it into a circuit switched call.

As is known in the art, a SIP INVITE message may include a location object (herein "LO" in the drawings). The location object represents the location of the calling communications device. The representation may be geo-coordinates or may be in master street address guide (MSAG) validated civic format. The calling communications device may provide the location object or the IP service provider network may add the location object to the INVITE message.

Figure 2:
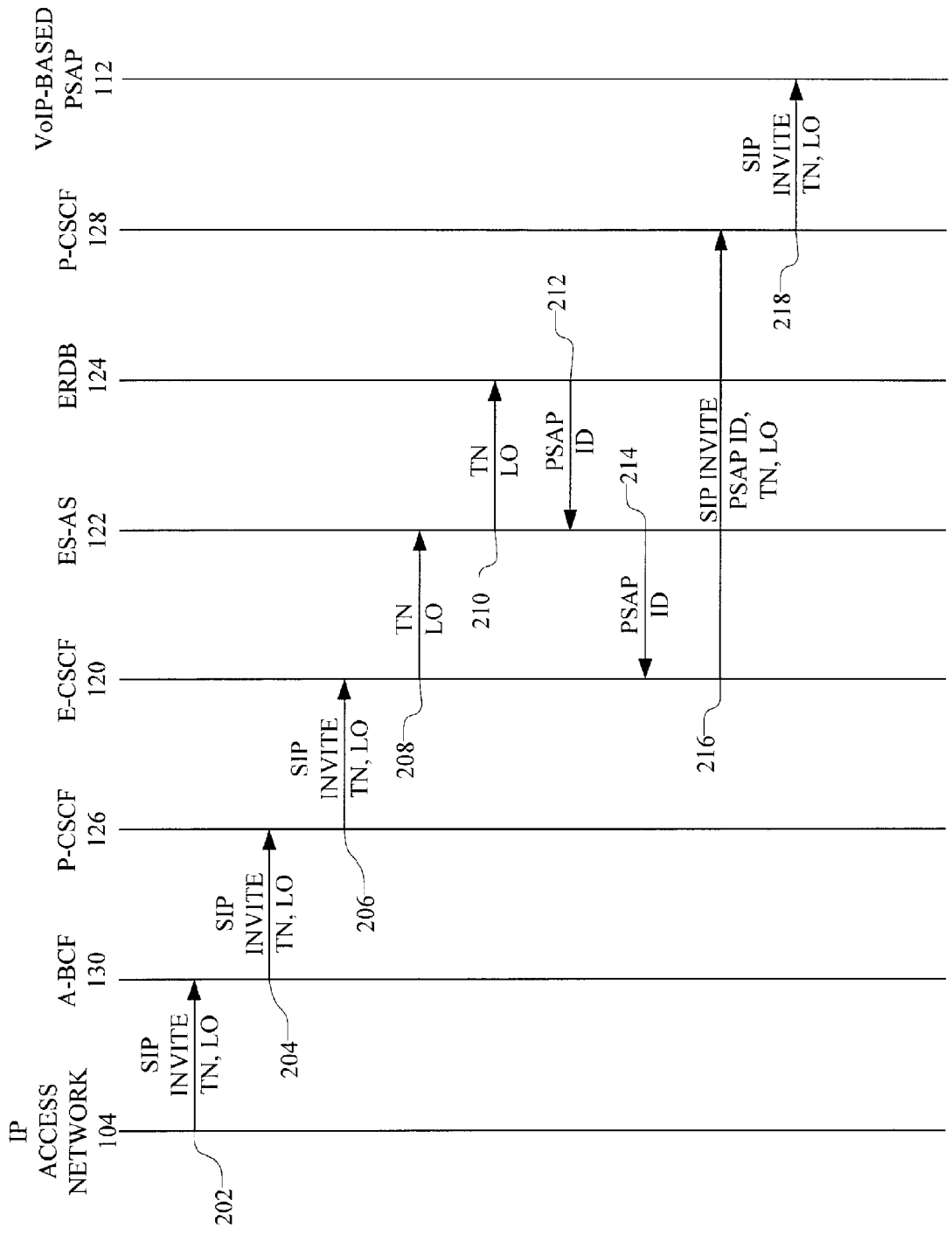
FIG. 2 illustrates a call flow in the context of FIG. 1 wherein an emergency call originates in a VoIP network and a location object is present in the setup message.

FIG. 2 illustrates an exemplary call flow of an emergency services request from IP access network 104 wherein VoIP-based PSAP 112 serves the ESZ wherein the emergency services call originated. In this exemplary embodiment, the emergency services request SIP message from IP access network 104 originated with a location object. In step 202, the emergency services call SIP INVITE message, which includes the TN of the calling communications device and the location object, is delivered from IP access network 104 to A-BCF 130. A-BCF 130 performs checks on the SIP INVITE message to determine whether the message is valid and forwards the INVITE message (including the TN and location object) to P-CSCF 126 in step 204. In step 206, P-CSCF 126 determines that the INVITE message is an emergency services request and forwards it to E-CSCF 120 with the TN and location object.

E-CSCF 120 also determines that the SIP INVITE message is an emergency services call and sends the TN and location object to ES-AS 122, in step 208. Because the emergency services call includes a location object, ES-AS 122 has sufficient information to determine the routing instructions using internal procedures (discussed below in connection with FIG. 8). Therefore, in step 210, ES-AS 122 queries ERDB 124 with the location object, the TN or both. ERDB 124 queries its internal databases (described further, below, in connection with FIGS. 7 and 8). In step 212, ERDB 124 returns the PSAP ID of PSAP 112, which, for purposes of this example, is the PSAP that serves the location described by the location object, to ES-AS 122.

ES-AS 122 returns the routing instructions to E-CSCF 120 in step 214. In this exemplary embodiment, the routing instructions comprise the PSAP ID. In step 216, E-CSCF 120 sends the SIP INVITE message, which now includes the PSAP ID, the TN and the location object, to P-CSCF 128. Finally, in step 218, P-CSCF 128 forwards the SIP INVITE message with the TN and location object to PSAP 112.

Figure 3:
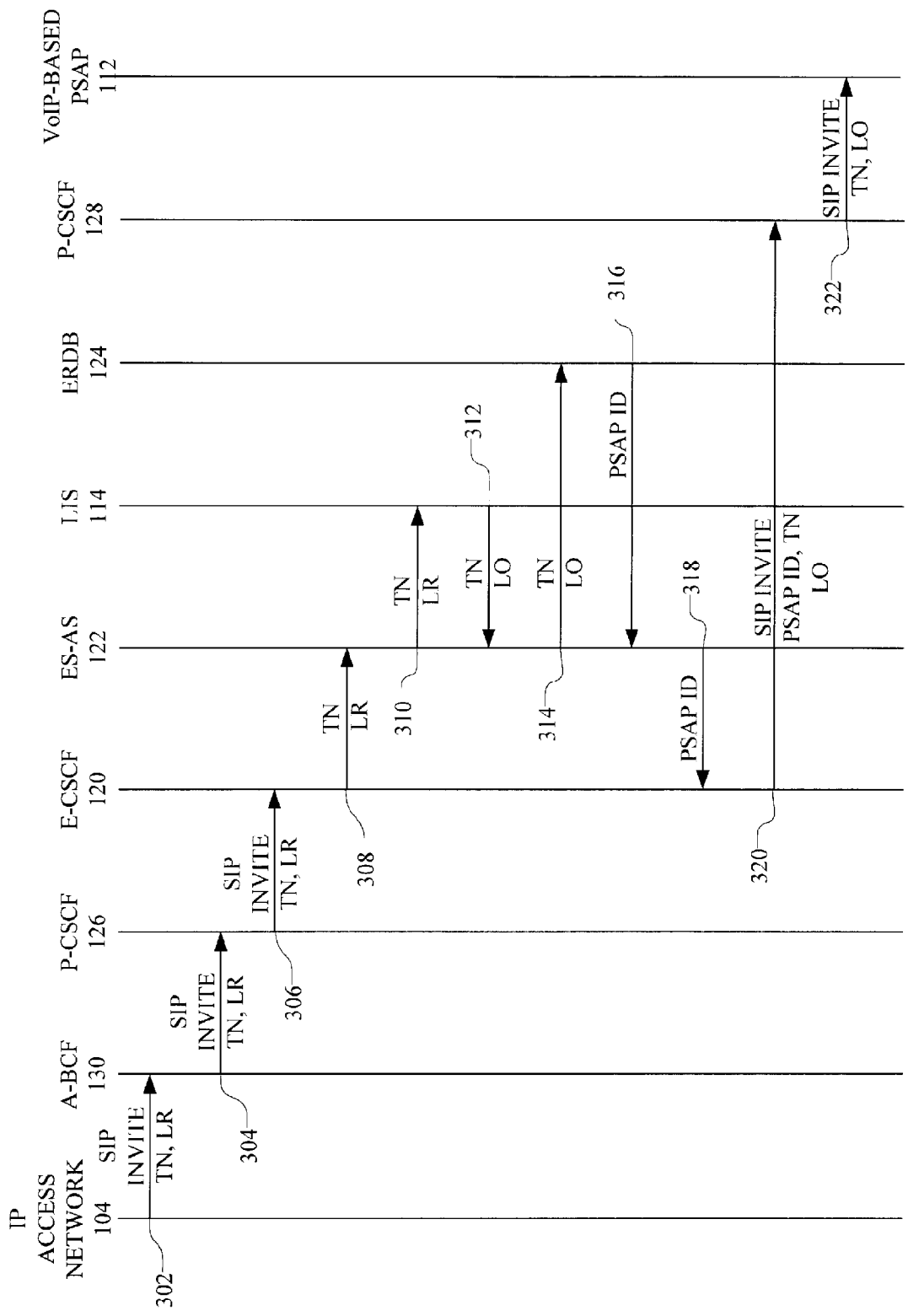
FIG. 3 illustrates a call flow in the context of FIG. 1 wherein an emergency services call originates in a VoIP network and a location reference may be present but a location object is not present in the call setup message.

FIG. 3 illustrates an exemplary call flow of an emergency services request from IP access network 104 wherein VoIP-based PSAP 112 serves the ESZ wherein the emergency services call originated. In this exemplary embodiment, the emergency services request SIP message from IP access network 104 originated without a location object. Instead of a location object, the SIP INVITE message may contain a location reference ("LR" in the FIG.'s). The location reference may include a query key to a database or may be empty (i.e., null).

In accordance with this exemplary embodiment, in step 302, the emergency services call SIP INVITE message, which includes the TN of the calling communications device and the location reference, is delivered from IP access network 104 to A-BCF 130. A-BCF 130 performs checks on the SIP INVITE message to determine whether the message is valid and forwards the INVITE message (including the TN and location reference) to P-CSCF 126 in step 304. In step 306, P-CSCF 126 determines that the INVITE message is an emergency services request and forwards it to E-CSCF 120 with the TN and location reference.

E-CSCF 120 also determines that the SIP INVITE message is an emergency services call and sends the TN and location reference to ES-AS 122, in step 308. Because the emergency services call does not include a location object, ES-AS 122 does not have sufficient information to determine the routing instructions using internal procedures. Therefore, in step 310, ES-AS 122 queries LIS 114 with the TN, the location reference or both. LIS 114 returns a location object in step 312.

In step 314, ES-AS 122 queries ERDB 124 with the location object, the TN or both. ERDB 124 queries its internal databases and, in step 316, ERDB 124 returns the PSAP ID of PSAP 112, which, for purposes of this example, is the PSAP that serves the location described by the location object, to ES-AS 122.

ES-AS 122 returns the routing instructions to E-CSCF 120 in step 318. In this exemplary embodiment, the routing instructions comprise the PSAP ID. In step 320, E-CSCF 120 sends the SIP INVITE message, which now includes the PSAP ID, the TN and the location object, to P-CSCF 128. Finally, in step 322, P-CSCF 128 forwards the SIP INVITE message with the TN and location object to PSAP 112.

Figure 4:
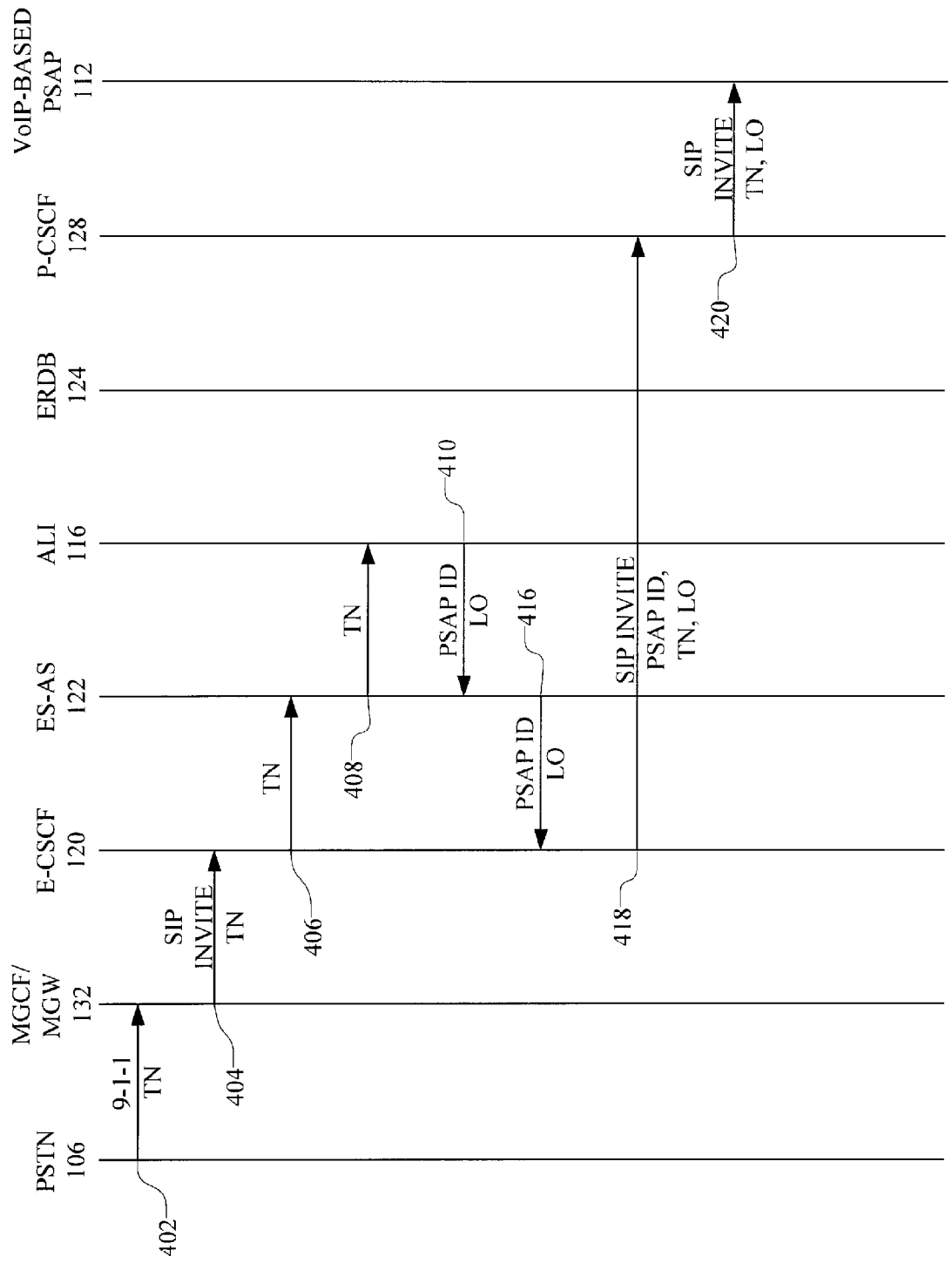
FIG. 4 illustrates a call flow in the context of FIG. 1 wherein an emergency services call originates in a circuit-switched network and a VoIP-based PSAP serves the area wherein the call originated.

FIG. 4 illustrates an exemplary call flow of an emergency services call request from PSTN 106 wherein VoIP-based PSAP 112 serves the ESZ wherein the emergency services call originated. In this exemplary embodiment, the emergency services request does not include a location object or a location reference. In step 402, the emergency services call, which includes the TN of the calling communications device, is delivered from PSTN 106 to MGCF/MGW 132. MGCF/MGW 132 originates a SIP INVITE message and sends the INVITE message (including the TN) to E-CSCF 120 with the TN.

E-CSCF 120 determines that the SIP INVITE message is an emergency services call and sends the TN to ES-AS 122, in step 406. Because the emergency services call does not include a location object or a location reference, ES-AS 122 queries ALI 116 with the TN in step 408. In step 410, ALI 116 returns a PSAP ID and location object (usually in MSAG format) to ES-AS 122. One skilled in the art will understand that, if ALI 116 only returns a location object, ES-AS 122 would query ERDB 124 with the location object to determine a PSAP ID, as in steps 314 and 316 of FIG. 3.

ES-AS 122 returns the routing instructions to E-CSCF 120 in step 416. In this exemplary embodiment, the routing instructions comprise the PSAP ID. In step 418, E-CSCF 120 sends the SIP INVITE message, which now includes the PSAP ID, the TN and the location object, to P-CSCF 128. Finally, in step 420, P-CSCF 128 forwards the SIP INVITE message with the TN and location object to PSAP 112.

Figure 5:
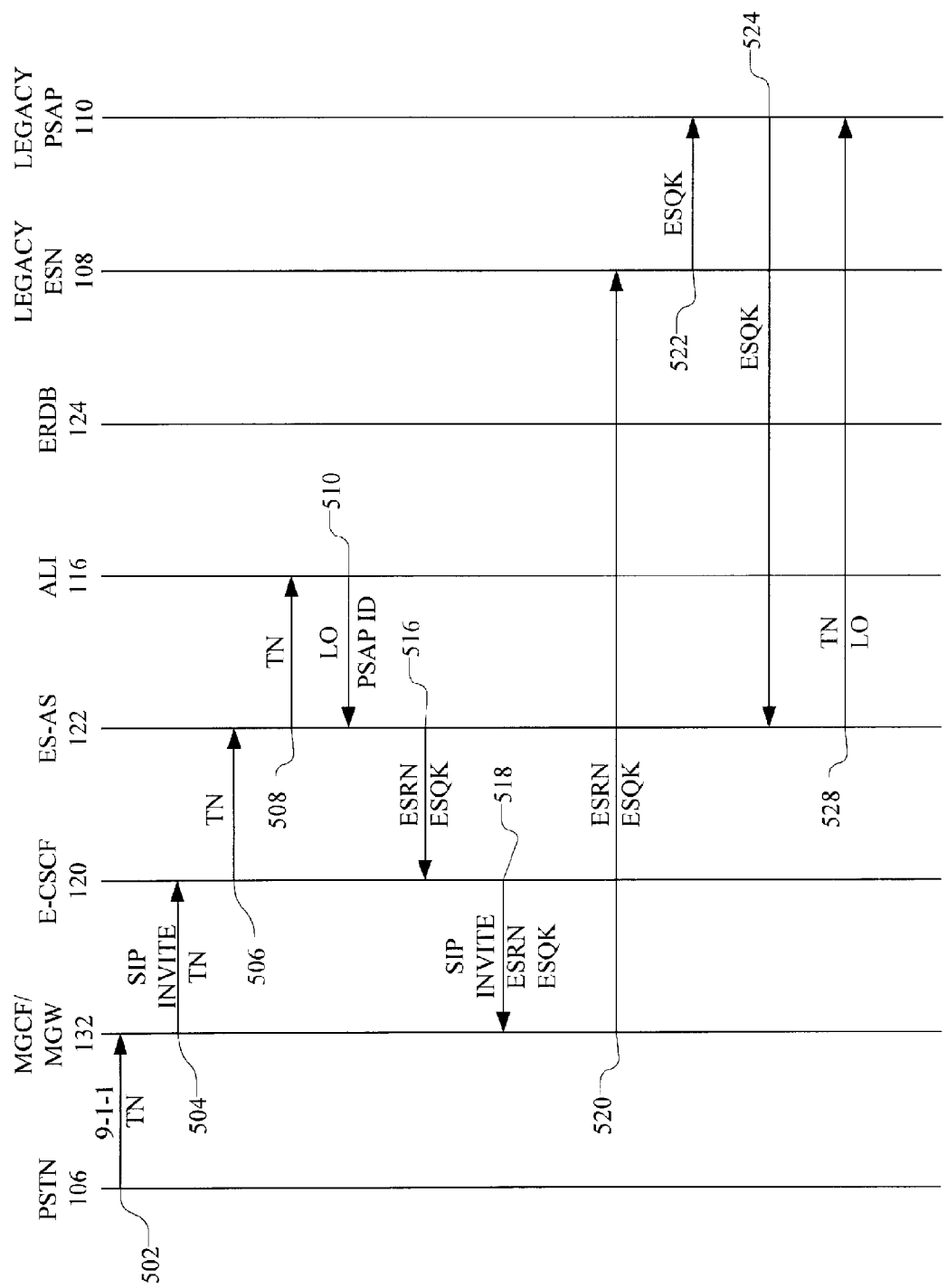
FIG. 5 illustrates a call flow in the context of FIG. 1 wherein an emergency services call originates in a circuit-switched network and a legacy PSAP serves the area wherein the call originated.

FIG. 5 illustrates an exemplary call flow of an emergency services call from PSTN 106 wherein legacy PSAP 110 serves the ESZ wherein the emergency services call originated. In this exemplary embodiment, the emergency services call cannot originate with a location object. In step 502, the emergency services call, which includes the TN of the calling communications device, is delivered from PSTN 106 to MGCF/MGW 132. In step 504, MGCF/MGW 132 determines that the incoming call is an emergency services call and originates a SIP INVITE message that includes the TN to E-CSCF 120.

E-CSCF 120 determines that the SIP INVITE message is an emergency services call and sends the TN to ES-AS 122, in step 506. In step 508, ES-AS 122 queries ALI 116 with the TN. In step 510, ALI 116 returns a location object and the PSAP ID of legacy PSAP 110, which, for purposes of this example, is the PSAP that serves the location of the calling communications device, to ES-AS 122.

ES-AS 122 returns routing instructions to E-CSCF 120 in step 516. Because the PSAP ID in this exemplary embodiment comprises a legacy PSAP, the routing instructions cannot comprise the PSAP ID. Therefore, ES-AS 122 selects an emergency services routing number (ESRN), which represents a TN of a selective router in legacy emergency services network 108 and an emergency services query key (ESQK) that represents both legacy PSAP 110 and a key by which legacy PSAP 110 may obtain the TN and location object of the calling communications device. To this end, ES-AS 122 stores the TN and location object retrieved from ALI 116.

In step 518, E-CSCF 120 sends the SIP INVITE message, which now includes the ESRN and ESQK, to MGCF/MGW 132. In step 520, MGCF/MGW 132 originates a call in or to legacy emergency services network 108 and forwards the ESRN and ESQK. Legacy emergency service network 108 forwards the call to legacy PSAP 110, passing the ESQK in step 522. Legacy PSAP 110 queries ES-AS 122 (either directly or via ALI 114) with the ESQK for the TN and the location object of the calling communications device in step 524. Finally, in step 528, ES-AS 122 returns the TN and location object that it had previously stored to legacy PSAP 110.

Figure 6:
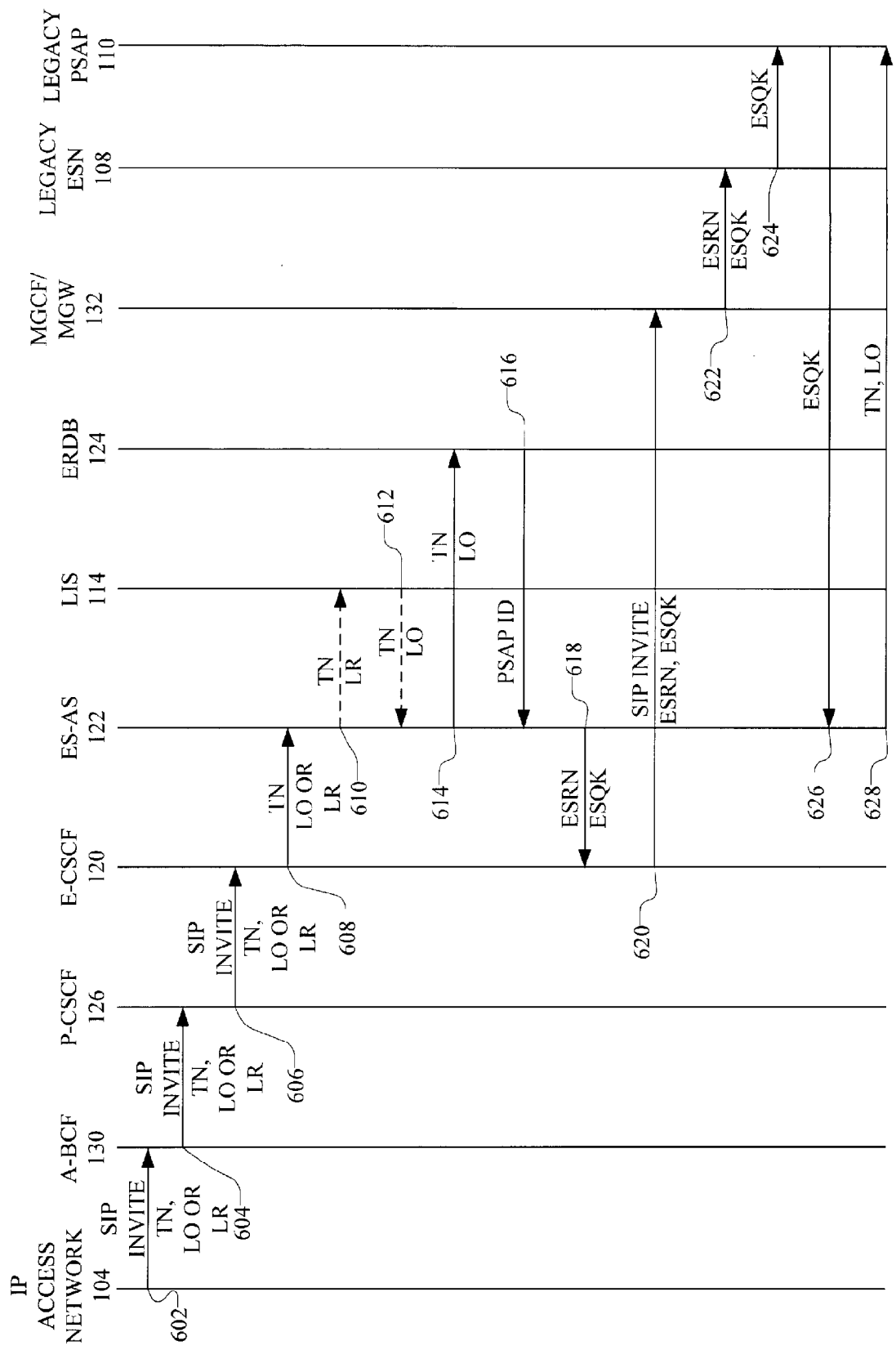
FIG. 6 illustrates a call flow in the context of FIG. 1 wherein an emergency services call originates in a VoIP network and a legacy PSAP serves the area wherein the call originated.

FIG. 6 illustrates an exemplary call flow of an emergency services request from IP access network 104 wherein legacy PSAP 110 serves the ESZ wherein the emergency services call originated. In this exemplary embodiment, the emergency services request SIP message from IP access network 104 may originate with or without a location object. In step 602, the emergency services call SIP INVITE message, which includes the TN of the calling communications device and the location object or a location reference (which may be null), is delivered from IP access network 104 to A-BCF 130. A-BCF 130 performs checks on the SIP INVITE message to determine whether the message is valid and forwards the invite message (including the TN and location object or location reference) to P-CSCF 126 in step 604. In step 606, P-CSCF 126 determines that the INVITE message is an emergency services request and forwards it to E-CSCF 120 with the TN and location object or location reference.

E-CSCF 120 also determines that the SIP INVITE message is an emergency services call and sends the TN and location object to ES-AS 122, in step 608. If ES-AS 122 receives a location reference, it optionally (as represented by the dashed line) in step 610 queries LIS 114 with the TN and location reference. LIS 114 responds with a location object in optional step 612. At this point, ES-AS 122 has sufficient information to determine the routing instructions using internal procedures. Therefore, in step 614, ES-AS 122 queries ERDB 124 with the location object, the TN or both. ERDB 124 queries its internal databases and, in step 616, ERDB 124 returns the PSAP ID of legacy PSAP 110 to ES-AS 122.

ES-AS 122 returns the routing instructions to E-CSCF 120 in step 618. In this exemplary embodiment, the routing instructions comprise an ESRN and ESQK. In step 620, E-CSCF 120 sends the SIP INVITE message, which now includes the ESRN and ESQK, to MGCF/MGW 132. MGCF/MGW 132 originates a call into legacy emergency services network 108 passing the ESRN and ESQK in step 622. Legacy emergency services network 108 delivers the emergency services call to legacy PSAP 112, passing the ESQK in step 624. In step 626, legacy PSAP 110 queries ES-AS 122 (either directly or via ALI 114) with the ESQK and, in step 628, ES-AS 122 returns the TN and location object to legacy PSAP 110.

Figure 7:
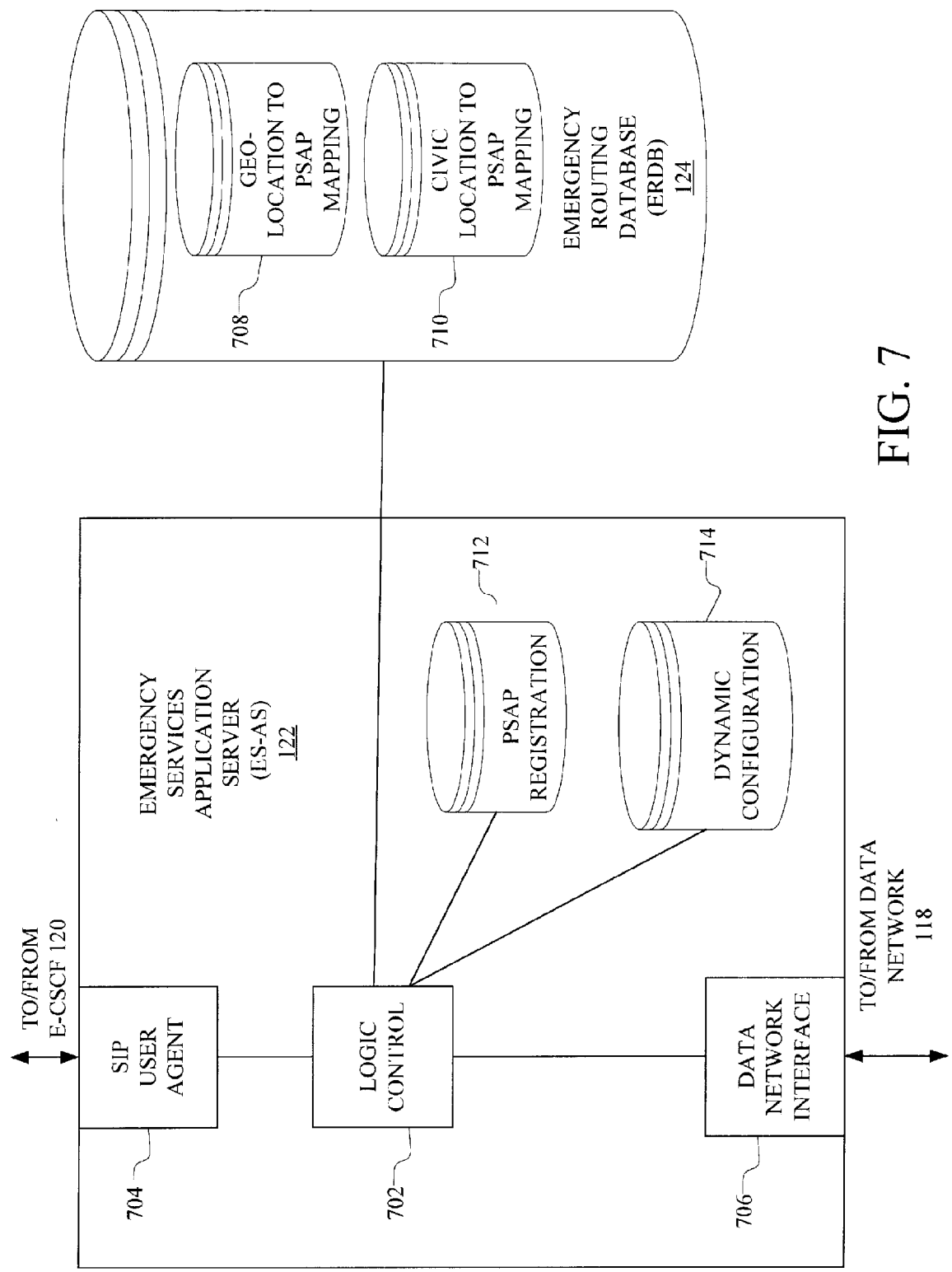
FIG. 7 illustrates a block diagram of an ES-AS of FIG. 1.

FIG. 7 illustrates a block diagram of the internal architecture of an ES-AS 122 and ERDB 124. Logic control 702 provides over-all control and processing for ES-AS 122 and, more specifically, executes the sequencing logic as shown in the flow charts of FIGS. 8A-8C. SIP User Agent 704 provides a communications interface between logic control 702 and E-CSCF 120. Data network interface 706 provides an interface to data network 118. As stated above, data network interface 706 may provide direct links to LIS 114, ALI 116 or both. Data network interface 706 may also provide a link to a data network, such as data network 118, as illustrated, either in addition to or supplemental to any direct links.

Logic control 702 is also connected to ERDB 124. ERDB 124 includes a geo-location to PSAP mapping database 708 and a civic location to PSAP mapping database 710. As will be discussed further, below, in connection with FIG. 8, logic control 702 queries one of these databases using the location object as a key. If the location object comprises X/Y coordinates, then logic control 702 applies the location object to geo-location to PSAP mapping database 708. If the location object comprises a civic address, logic control 702 applies the location object to civic location to PSAP mapping database 710. The result of either database query is a PSAP ID.

Logic control 702 is connected to PSAP registration database 712. Logic control 702 queries PSAP registration database 712 with a PSAP ID obtained from ERDB 124 to determine whether the PSAP represented by the PSAP ID is registered. If the PSAP is registered, other information, such as alternate PSAP ID's, is stored therein and is accessible to logic control 702 (as will be described further, below, in connection with the flow charts of FIG. 8). PSAP Registration database 712 also contains registration state (presence) of the plurality of PSAP's supported by VoIP-based emergency services network 102. IP-capable PSAP's, such as PSAP 112, may register via a SIP registration message.

In accordance to one aspect of this invention, logic control 702 is connected to dynamic configuration database 714. Dynamic configuration database 714 enables PSAP's or other authorized agencies to configure routing guidelines dynamically for both IP-based PSAP's and legacy PSAP's. For example, a PSAP may specify hours of operations and the alternate PSAP(s) to cover out of hours. Logic control 702 queries dynamic configuration database 714 in real time with the PSAP ID received from ERDB 124 to determine if there are overriding routing instructions to the statically defined routing instructions of ERDB 124.

Figure 8A:
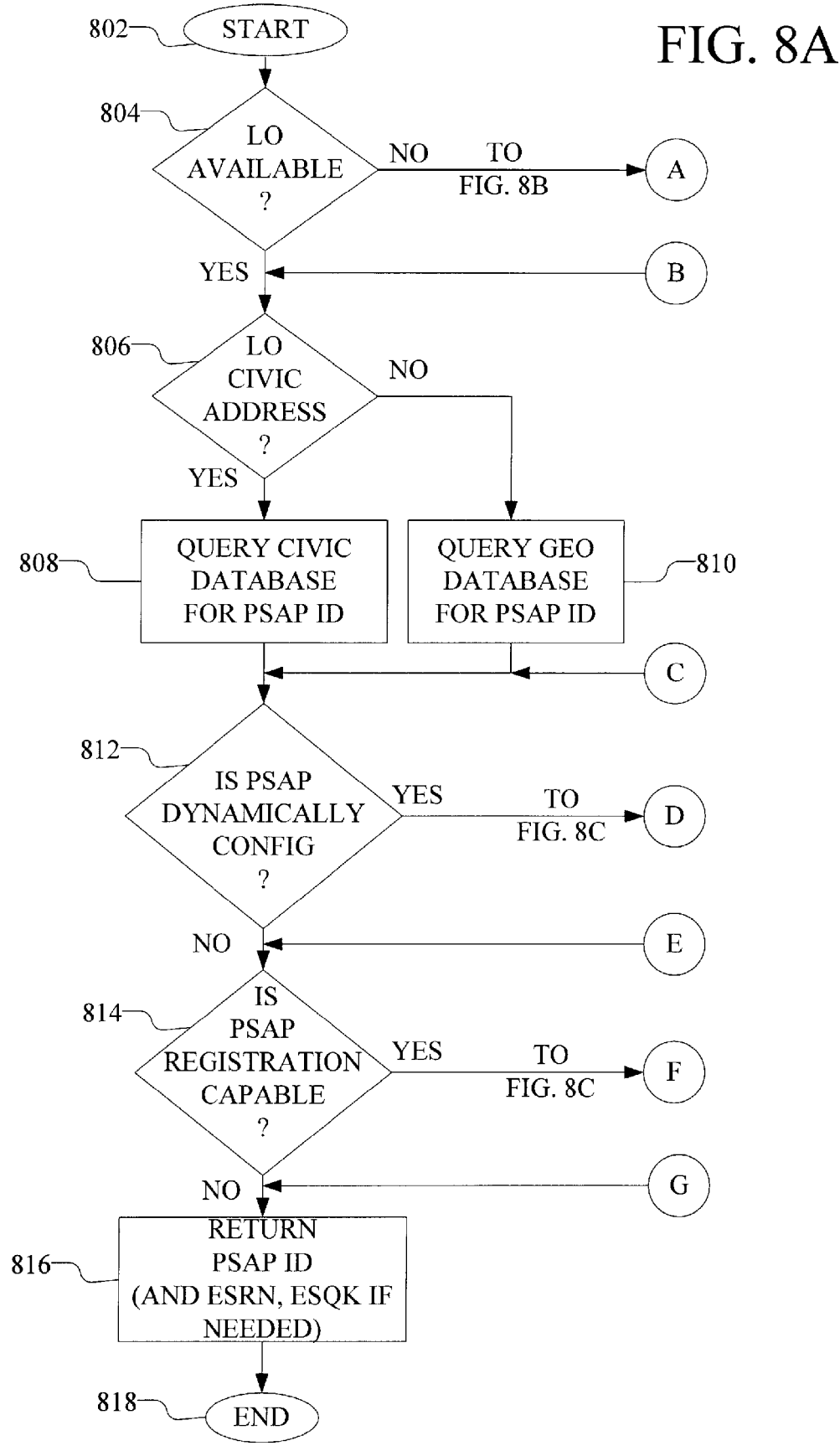
FIGS. 8A through 8C illustrates a flow chart of processing in the context of the ES-AS of FIG. 7 to provide routing information.
Figure 8B:
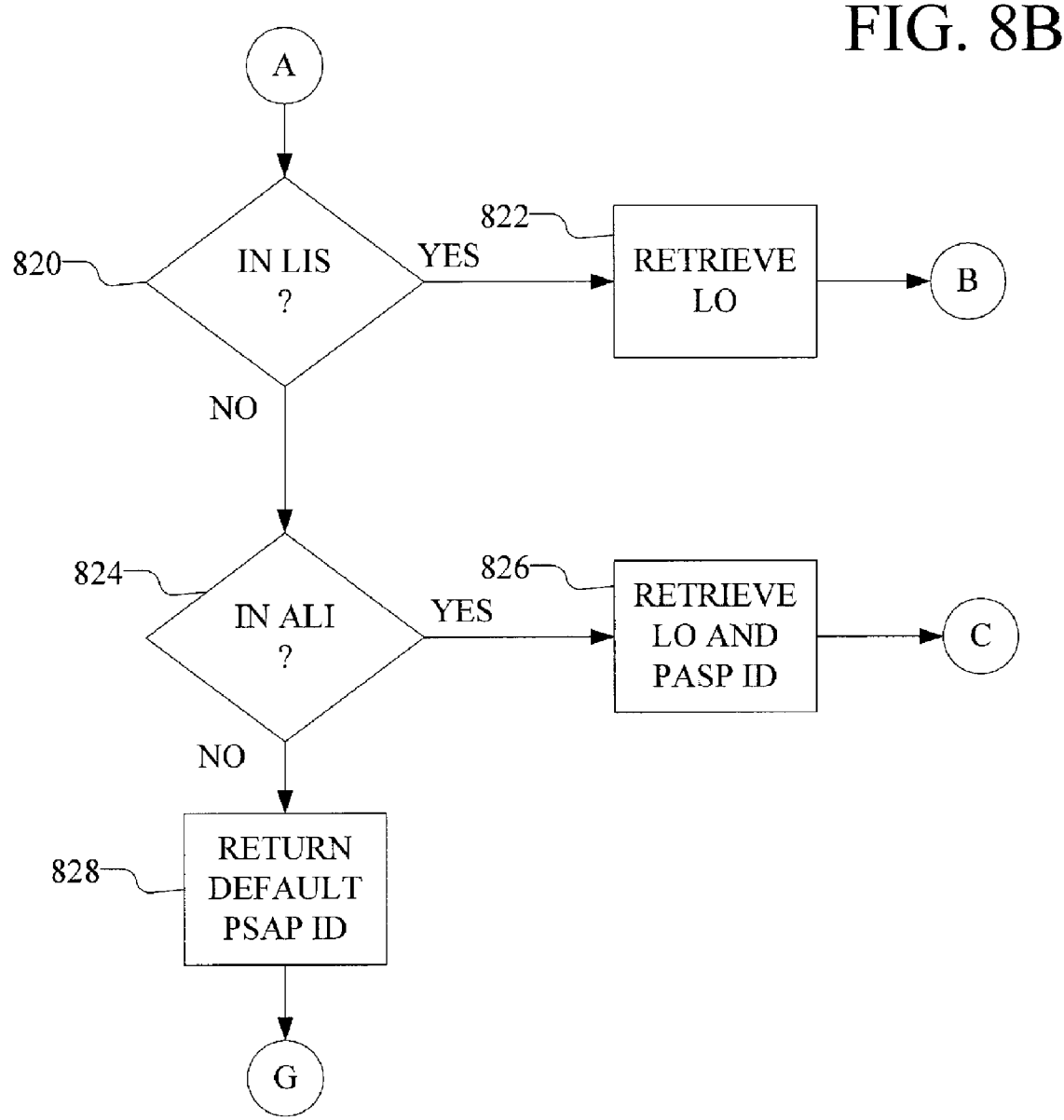
Figure 8C:
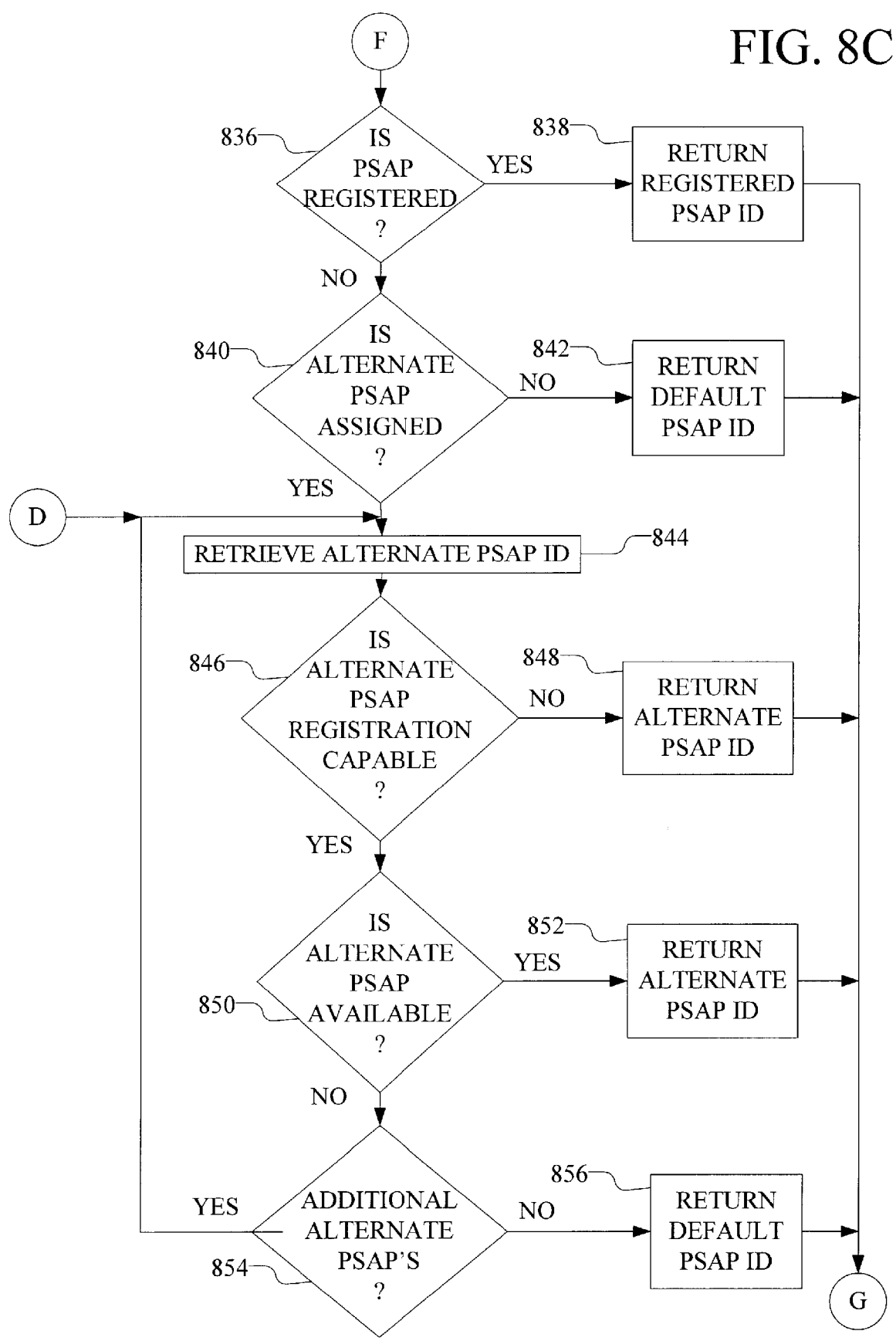

Turning now to FIGS. 8A-8C, processing in logic control 702 of ES-AS 122 is illustrated. Processing starts in FIG. 8A at 802, when logic control 702 receives an emergency call request. Processing continues to decision diamond 804, where a determination is made whether a location object is available. If it is not, then processing continues through connector A to FIG. 8B. If a location object is present, then processing continues to decision diamond 806.

In decision diamond 806, a determination is made whether the location object comprises a civic (MSAG) address. If it does, then processing continues to action box 808, where logic control 702 queries civic location to PSAP mapping database 710 to obtain a PSAP ID. If the location does not comprise a civic address, then processing proceeds to action box 810, where logic control 702 queries geo-location to PSAP mapping database 708 to obtain a PSAP ID. Processing from both action box 808 and action box 810 (and connector C) proceeds to decision diamond 812.

In decision diamond 812, a determination is made whether the PSAP represented by the PSAP ID obtained above is dynamically configured by logic control 702 querying dynamic configuration database 714. If it is, then processing proceeds through connector D to FIG. 8C. If the PSAP is not dynamically configured, then processing proceeds to decision diamond 814.

In decision diamond 814, a determination is made whether the PSAP represented by the PASP ID obtained above is registration capable by querying registration database 712. If it is, then processing proceeds through connector F to FIG. 8C. If the PSAP is not registration capable (as would be the case, for example, of most legacy PSAP's), then processing proceeds to action box 816.

In action box 816, logic control 702 returns the PSAP ID and ESRN, ESQK pair if needed to E-CSCF 120. As discussed above, ESRN and ESQK are need when the selected PSAP comprises a legacy PSAP connected to a legacy emergency services network. Selection of ESRN and ESQK is discussed in detail in U.S. Pat. No. 6,771,742 B2, which issued to McCalmont, et al. on Aug. 3, 2004 and is assigned to the assignee of this invention and is incorporated herein in its entirety. Processing ends at 818.

Turning now to FIG. 8B, processing from connector A, FIG. 8A, is shown. Processing in FIG. 8B is executed when no location object is received with the emergency services request. Processing starts in decision diamond 820 where a determination is made whether the location of the calling communications device is found in a LIS, such as LIS 114 (FIG. 1). If it is, then a location object is retrieved from the LIS in action box 822 and processing returns through connector B to FIG. 8A.

If the location of the calling communications device is not found in a LIS, as determined in decision diamond 820, then process proceeds to decision diamond 824. In decision diamond 824, a determination is made whether the location of the calling communications device is found in an ALI, such as ALI 116 (FIG. 1). If the location object is found in an ALI, then the location object and PSAP ID are obtained in action box 826 and processing continues through connector C back to FIG. 8A.

If the location of the calling communications device is not found in an ALT, as determined in decision diamond 824, then processing proceeds to action box 828. In action box 828, a location of the calling communications device cannot be determined and a default PSAP ID is assigned to handle the emergency services call. Processing proceeds from action box 828 to connector G and back to FIG. 8A.

Turning now to FIG. 8C, processing from connector F, FIG. 8A, is shown. Processing starts in decision diamond 836, where a determination is made whether the currently-selected PSAP ID is register by logic control 702 applying the PSAP ID to PSAP registration database 712. If it is, then processing proceeds to action box 838, where the registered PSAP ID is returned. Processing continues from action box 838 through connector G to FIG. 8A.

If the currently-selected PSAP ID is not registered, then processing proceeds to decision diamond 840. In decision diamond 840, a determination is made whether an alternate PSAP ID is assigned. If an alternate PSAP ID is not assigned, then processing proceeds to action box 842, where a default PSAP ID is returned. Processing proceeds from action box 842 through connector G to FIG. 8A.

If there is an alternate PSAP ID available, as determined in decision diamond 840, then processing proceeds to action box 844, where the alternate PSAP ID is retrieved. Processing continues to decision diamond 846, where a determination is made whether the retrieved alternate PSAP ID is registration capable by logic control 702 querying registration database 712. If it is not, then the retrieved alternate PSAP ID is returned in action box 848. Processing proceeds from action box 848 through connector G to FIG. 8A.

If the alternate PSAP is registration capable, as determined in decision diamond 846, then processing proceeds to decision diamond 850. In decision diamond 850, a determination is made whether the alternate PSAP is available, by logic control 702 applying the alternate PSAP ID to dynamic configuration database 714. If it is, then the alternate PSAP ID is returned in action box 852. Processing proceeds from action box 852 through connector G to FIG. 5A.

If the alternate PSAP is not available as determined in decision diamond 850, then processing continues to decision diamond 854. In decision diamond 854, a determination is made if there are anymore alternate PSAP's listed. If there are, then processing loops back to action box 844, where another alternate PSAP ID is retrieved.

If there are no further alternate PSAP's, as determined in decision diamond 854, then processing continues to action box 856. A default PSAP ID is returned in action box 856. Processing proceeds from action box 856 through connector G to FIG. 8A.

It is to be understood that the above-described embodiment is merely illustrative of the present invention and than many variations of the above-described embodiment can be devised by one skilled in the art without departing from the scope of the invention. It is therefore intended that such variations be included within the scope of the following claims and their equivalents.

The invention claimed is:

1. An application server for use by a public emergency services network comprising:
   a logic control configured to determine routing instructions responsive to routing instructions requests from said public emergency services network and also configured to determine whether said routing instructions request includes a location object and an identification of a requesting communications device;
   a public database configured to return a destination identification responsive to a query comprising said location object from said logic control; and
   a data communications module configured to query a remote public database responsive to a query comprising said identification of said requesting communications device and configured to forward a destination identification to said logic control responsive to receipt of said destination identification from said public remote database.

2. An application server in accordance with claim 1 wherein said location object comprises geo-coordinates.

3. An application server in accordance with claim 2 wherein said public database comprises a geo-coordinates-to-destination-identification database.

4. An application server in accordance with claim 3 wherein said destination identification comprises a public safety answering point identification (PSAP ID).

5. An application server in accordance with claim 1 wherein said location object comprises a civic address.

6. An application server in accordance with claim 5 wherein said public database comprises a civic-address-to-destination-identification database.

7. An application server in accordance with claim 6 wherein said destination identification comprises a PSAP ID.

8. An application server in accordance with claim 1 wherein said public remote database comprises a location information server (LIS) and wherein said data communications module is configured to query said LIS and forward said destination identification from said LIS to said logic control.

9. An application server in accordance with claim 8 wherein said destination identification comprises a PSAP ID.

10. An application server in accordance with claim 8 wherein said destination identification comprises a location object and wherein said logic control is further configured to query said public database with said location object from said LIS to determine a PSAP ID.

11. An application server in accordance with claim 1 wherein said public remote database comprises an automatic location information (ALI) database and wherein said data communications module is configured to query said ALI and forward said destination identification from said ALI to said logic control.

12. An application server in accordance with claim 11 wherein said destination identification comprises a PSAP ID.

13. An application server in accordance with claim 11 wherein said destination identification comprises a location object and wherein said logic control is further configured to apply said location object to said public database to determine a PSAP ID.

14. An application server in accordance with claim 11 wherein said logic control is further configured to determine an emergency services routing number (ESRN) and emergency services query key (ESQK) responsive to said destination identification and configured to forward said ESRN and said ESQK to said public emergency services network for call routing purposes.

15. An application server in accordance with claim 14 wherein said logic control is further configured to store said identification of said requesting communications device.

16. A method for use in a public emergency services network for routing an emergency services call to a public safety answering point (PSAP), said emergency services call comprising an identification of a calling communications device, said method comprising:
   determining whether a location object is included with said emergency services call;
   querying a public remote database with said identification of said calling communications device to obtain a location object if said location object is not present in said emergency services call;
   obtaining an identification of a PSAP (PSAP ID) responsive to said location object; and
   routing said emergency services call responsive to said PSAP ID.

17. A method in accordance with claim 16 wherein said location object comprises geo-coordinates and wherein obtaining an identification of a PSAP ID responsive to said location object comprises applying said geo-coordinates to a geo-coordinate-to-PSAP ID public database.

18. A method in accordance with claim 16 wherein said location object comprises a civic address and wherein obtaining an identification of a PSAP ID responsive to said location object comprises applying said civic address to a civic-address-to-PSAP ID public database.

19. A method in accordance with claim 16 wherein said public remote database comprises a location information server (LIS) and wherein querying a public remote database comprises querying said LIS with said identification of said calling communications device to obtain said location object.

20. A method in accordance with claim 16 wherein said public remote database comprises an automatic location information (ALI) database and wherein querying a public remote database comprises querying said ALI with said identification of said calling communications device to obtain said location object.

21. A method in accordance with claim 16 wherein querying a public remote database comprises querying said ALI with said identification of said calling communications device to obtain said location object and said PSAP ID.

22. A method in accordance with claim 16 further including:
   selecting an emergency services routing number (ESRN) and an emergency services query key (ESQK) if said PSAP ID is not in said emergency services network.

23. A method in accordance with claim 22 further including:
   storing said identification of said calling communications device and said location object in relation to said ESQK.

24. A method in accordance with claim 22 further including:
   routing said emergency services call through said public emergency services network to a public switched telephone network (PSTN) responsive to said ESRN and said ESQK; and
   routing said emergency services call through said PSTN to said PSAP based on said ESRN and said ESQK.

25. A method in accordance with claim 24 further including:
   forwarding said identification of said calling communications device and said location object to said PSAP responsive to receipt of said ESQK from said PSAP.

26. A method for use in a public emergency services network for routing an emergency services call to a public safety answering point (PSAP), said emergency services call comprising an identification of a calling communications device, said method comprising:
   registering a PSAP ID responsive to a request from a PSAP;
   determining whether a location object is included with said public emergency services call includes a location object;
   querying a public remote database with said identification of said calling communications device to obtain a location object if said location object is not present in said emergency services call;
   obtaining an identification of a PSAP (PSAP ID) responsive to said location object;
   determining whether said PSAP ID is registered; and routing said emergency services call responsive to said PSAP ID responsive to a determination that said PSAP ID is registered.

27. A method in accordance with claim 26 wherein said step of registering said PSAP ID comprises said PSAP registering its availability.

28. A method in accordance with claim 26 wherein said step of registering said PSAP ID comprises said PSAP registering an alternate PSAP ID.

29. A method in accordance with claim 28 further including routing said emergency services call using said alternate PSAP ID responsive to a determination that said PSAP ID is not registered.

30. A method in accordance with claim 26 wherein said step of registering said PSAP ID comprises said PSAP registering a plurality of PSAP ID's.

31. A method in accordance with claim 30 further including routing said emergency services call using one of said plurality of alternate PSAP ID's responsive to a determination that said PSAP ID is not registered.

32. A method in accordance with claim 30 wherein said plurality of PSAP ID's comprise an ordered list of PSAP ID's, said method further including:
   determining whether a first alternate PSAP ID is registered responsive to a determination that said PSAP ID is not registered; and
   sequentially determining whether any of said ordered list of PSAP ID's is registered responsive to determining that a previous alternate PSAP ID is not registered.

33. A method in accordance with claim 26 routing said emergency services call to a default PSAP ID if said PSAP ID is not registered.

* * * * *